United States Patent [19]
Stephens et al.

[11] 3,819,553
[45] June 25, 1974

[54] STABILIZED THERMOPLASTIC POLYURETHANE COMPOSITION

[75] Inventors: Roger W. Stephens; Christiaan Vervloet; Hugo C. W. Monnee, all of Delft, Netherlands

[73] Assignee: Shell Oil Company, Houston, Tex.

[22] Filed: July 13, 1972

[21] Appl. No.: 271,331

[30] Foreign Application Priority Data
Mar. 17, 1972  Great Britain.................... 12653/72

[52] U.S. Cl. ........ 260/28, 260/45.8 N, 260/77.5 SS
[51] Int. Cl............................................. C08g 51/60
[58] Field of Search.... 260/77.5 SS, 45.8 N, 18 TN, 260/45.80, 77.5 AT, 2.5 BB, 28

[56] References Cited
UNITED STATES PATENTS

| | | | |
|---|---|---|---|
| 2,916,472 | 12/1959 | Nischk et al. ............... | 260/77.5 AT |
| 3,179,625 | 4/1965 | Ehrhart........................ | 260/77.5 SS |
| 3,489,744 | 1/1970 | Schwarcy et al. ........... | 260/77.5 AT |
| 3,692,813 | 9/1972 | Hagemann et al. ......... | 260/77.5 AT |

*Primary Examiner*—M. J. Welsh

[57] ABSTRACT

Heat stabilized thermoplastic polyurethane rubber compositions comprise: (1) a thermoplastic polyurethane rubber together with small amounts each of (2) certain organic di-isocyanate dimers and (3) at least one inhibitor for the cross-linking of said polyurethane rubber.

11 Claims, No Drawings

STABILIZED THERMOPLASTIC POLYURETHANE COMPOSITION

BACKGROUND OF THE INVENTION

The invention relates to a stabilized thermoplastic polyurethane composition. More particularly, the invention relates to a stabilized thermoplastic polyurethane composition which comprises:
a. a thermoplastic polyurethane rubber;
b. an organic di-isocyanate dimer of the structure:

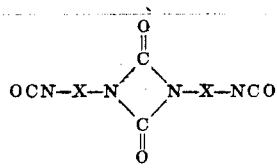

wherein X represents a hydrocarbon radical of up to about 16 carbon atoms, and
 c. at least one inhibitor for cross-linking of said polyurethane rubber.

Is is known that organic di-isocyanate dimers are used as cross-linking agents in polyurethanes. A preferred agent is dimerized 2,4-tolylene di-isocyanate, which is a white crystalline material having a melting point of approximately 145° C. When milling the compound in polyurethane at a temperature of up to 150° C, the di-isocyanate reacts with the short chain polymer to increase the chain length considerably and to form cross-links (see Wright and Cumming "Solid Polyurethane Elastomers," published 1969 by MacLaren and Sons, pages 154 and 155).

The cross-linking reaction is, in fact, the reaction between an isocyanate group and an existing urethane group and also the reaction of an isocyanate group with a urea group. An allophanate group and a biuret group are, respectively, formed. This causes cross-linking of the polyurethane.

It has now been found that cross-linking of the polyurethane can be avoided and that this can lead to uses where it is necessary or desirable to avoid forming cross-links in a variety of applications with polyurethane rubbers.

In a thermoplastic polyurethane rubber composition comprising both an organic di-isocyanate dimer and a cross-linking inhibitor, the function of the di-isocyanate dimer is quite different. In thermoplastic rubbers to be used for, e.g., injection molding at high temperatures, e.g., 200° C, an organic di-isocyanate dimer, as hereinbefore defined, builds up new urethane groups, where old ones are destroyed by the very high temperatures of compounding. In thermoplastic rubbers employed in injection molding at 200° C, cleavage of the urethane groups into isocyanate and hydroxyl groups occurs and the destroyed parts of the polyurethane skeleton are repaired by the organic di-isocyanate dimer. The dimer, in fact, then acts as a sort of repair kit or a stabilizer when a cross-linking inhibitor is present.

DESCRIPTION OF PREFERRED EMBODIMENT

The invention thus relates to a stabilized thermoplastic polyurethane composition which comprises:
a. a thermoplastic polyurethane rubber;
b. an organic di-isocyanate dimer of the structure:

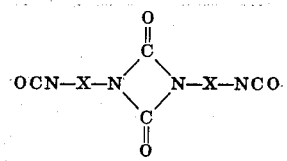

wherein X represents a hydrocarbon radical of up to about 16 carbon atoms, and
 c. at least one cross-linking inhibitor.

Suitable polyurethane rubbers are described, e.g., in Ser. No. 198,942 filed Nov. 15, 1971 now abandoned, incorporated herein by reference.

Preferred thermoplastic polyurethane rubbers have the following general formula:

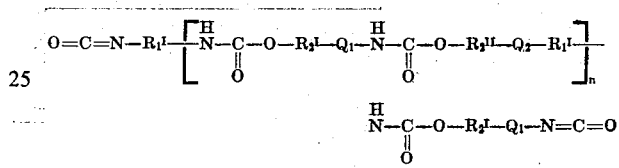

in which $Q_1$ represents a group selected from groups of the general formula:

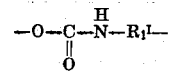

and groups of the formula:

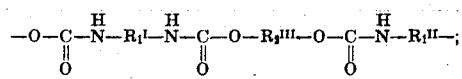

and $Q_2$ represents a group selected from a urethane group

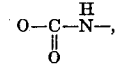

and a group of the formula:

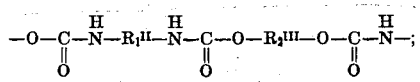

$n$ represents an integer, preferably in the range of from 5 to 60 inclusive;
$R_1{}^I$ and $R_1{}^{II}$ represent radicals derived from low-molecular weight diisocyanates, which may be the same or different;
$R_2{}^I$ and $R_2{}^{II}$ represent radicals derived from high-molecular weight diols, which may be the same or different, and
$R_2{}^{III}$ represents a radical derived from a low-molecular weight diol.

Particularly preferred thermoplastic polyurethane rubbers are those having in the formula a value for n of from 10 to 30, and wherein the molecular weight of the high-molecular weight diols, from which $R_2^I$ and $R_2^{II}$ are derived, is in the range of from 150 to 4,500, more preferably from 500 to 2,500; and wherein the molecular weight of the low-molecular weight diols, from which $R_2^{III}$ is derived, is in the range of from 60 to 100.

$R_2^I$ and $R_2^{II}$ may be derived from a poly-1,2-propane-diol. $R_2^{III}$ may be derived from a low-molecular weight diol, which may be 1,4-butanediol or 1,6-hexanediol.

$R_1^I$ and $R_1^{II}$ represent, e.g., radicals derived from 1,5-di-isocyanatonaphthalene or methylene diphenyl di-isocyanate.

This particular type of thermoplastic polyurethane rubbers is prepared in the following manner:

First, an isocyanate-terminated prepolymer of the structure:

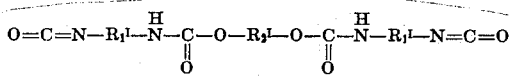

is prepared by reacting a high-molecular weight diol with a low-molecular weight di-isocyanate in a molar proportion of approximately 1:2.

Another diol-terminated prepolymer is prepared by reacting the above isocyanate prepolymer with a low-molecular weight diol in a molar ratio of approximately 1:2, so that a compound is formed of the structure:

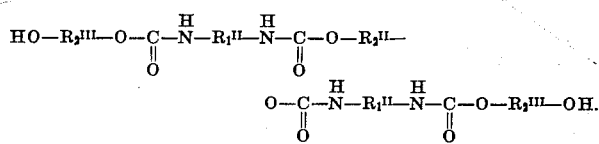

In order to distinguish the different prepolymers $R_1^I$ and $R_2^I$ have been given new symbols $R_1^{II}$ and $R_2^{II}$.

The isocyanate-terminated prepolymer and the diol-terminated prepolymer are condensed in a molar ratio of approximately 1:1, preferably in a molar ratio of between 0.90 and 0.99:1, at a temperature of up to about 100° C.

The thermoplastic polyurethane rubbers, generally, have the following properties within the ranges indicated below:

| | |
|---|---|
| tensile strength (kg/cm²) | 100–1,000 |
| elongation at break (%) | 300–1,000 |
| modulus 100% (kg/cm²) | 25–75 |
| modulus 300% (kg/cm²) | 15–400 |
| hardness (°Shore A) | 25–90 |
| angle tear strength (kg/cm) | 20–100 |

The organic di-isocyanate dimers may be prepared from those di-isocyanates containing an aromatic radical such as, e.g., a substituted or unsubstituted diphenylmethyl, tolyl, ditolylmethyl, diphenylethyl or naphthyl group.

Preferred are the dimers of methylene diphenyl di-isocyanate or of 2,4-toluene di-isocyanate. The dimers may be used in amounts of from about 0.2 to about 10 percent by weight, preferably from about 0.5 to about 5 percent by weight on the thermoplastic polyurethane rubber. In principle, all sorts of cross-linking inhibitors may be used. A number of them are, however, preferred, such as proton-liberating agents; more specifically organic acids having up to about 20 carbon atoms, preferably from about 5 to 18 carbon atoms, and mixtures thereof. Exemplary are furoic acid, benzoic acid, stearic acid and alpha-naphthoic acid. The cross-linking inhibitor is, generally, used in amounts of from about 0.2 to about 10 percent by weight, preferably between 0.5 and 5 percent by weight, on the thermoplastic polyurethane rubber. Also, a combination of organic acid with, e.g., 0.5–5percent by weight on rubber of halogenated (preferably chlorinated) paraffin wax is suitable.

EXAMPLE a. Production of prepolymer by condensation of poly-1,2-propane-diol (molecular weight 1,300) with methylene diphenyl di-isocyanate In the production of isocyanate-terminated prepolymer, 1 mole of poly-1,2-propanediol with a molecular weight of 1,300 and a molecular unsaturation of 3.25 percent, and being absolutely neutral, was reacted with 2 moles of methylene diphenyl di-isocyanate for a period of 3 to 4 hours at a temperature of 80° C under nitrogen. A highly viscous prepolymer was obtained. The poly-1,2-propanediol had not been subjected to a pretreatment with hydrochloric acid.

b. Production of hydroxyl-terminated prepolymer

The isocyanate-terminated prepolymer was combined with 1,4-butanediol at a temperature of between 60° and 90° C in a mol. ratio of prepolymer:1,4-butanediol of 1:2. This reaction mixture was stirred, under nitrogen, for one hour and was maintained overnight at a temperature of about 75° C. A highly viscous hydroxyl-terminated prepolymer was obtained.

c. Production of elastomer

For the production of elastomer, 1 mole of the isocyanate-terminated terminated prepolymer was stirred thoroughly for 15 minutes, together with 0.95 mole of the hydroxyl-terminated prepolymer at a temperature of 100° C without the use of catalysts. To the hydroxyl-terminated prepolymer a reinforcing agent was added. Thereafter the reaction mixture was allowed to gel completely in an oven at 100° C for 2 hours and was postcured for 1 week at 50° C.

Hereinafter a number of experiments with stearic acid and/or with 2,4 -tolylene di-isocyanate dimer are given, both in an amount of 3 parts per hundred parts by weight (PHR) of the thermoplastic polyurethane rubber made according to Example 1c.

In order to test the efficiency of the heat-stabilizing systems, the polymer samples were plasticized in a Brabander-type internal mixer for 20 minutes at 200° C; the polymer properties were determined before and after the Brabander treatment.

| Properties | Reference | Arubren CP (2) | Stearic acid (3) Desmodur TT (3) | Arubren CP (2) Stearic acid (3) Desmodur TT (3) | Umen C 4400 (2) Stearic acid (3) Desmodur TT (3) | Linevol 79 P (15) Stearic acid (3) Desmodur TT (3) | Arubren CP (2) Umen C 4400 (2) Stearic acid (3) Desmodur TT (3) | Desmodur TT (3) | Stearic acid (3) |
|---|---|---|---|---|---|---|---|---|---|
| Tensile strength (kg./cm.²): | | | | | | | | | |
| Before Brabender plasticizing | 300 | 275 | 282 | 290 | 140 | 155 | 140 | 382 | 164 |
| After Brabender plasticizing | 100 | 195 | 180 | 290 | 140 | 121 | 140 | *178 | 65 |
| Modulus 300% (kg./cm.²): | | | | | | | | | |
| Before Brabender plasticizing | 118 | 115 | 135 | 120 | 93 | 87 | 90 | 157 | 111 |
| After Brabender plasticizing | 86 | 118 | 113 | 124 | 90 | 84 | 98 | *158 | (**) |
| Elongation at break (percent): | | | | | | | | | |
| Before Brabender plasticizing | 650 | 570 | 550 | 580 | 550 | 580 | 550 | 490 | 480 |
| After Brabender plasticizing | 470 | 600 | 530 | 550 | 550 | 490 | 530 | *350 | 240 |
| Angle tear strength (kg./cm.): | | | | | | | | | |
| Before Brabender plasticizing | 72 | 65 | 69 | 66 | 56 | 45 | 57 | | |
| After Brabender plasticizing | 53 | 70 | 60 | 58 | 52 | 33 | 53 | | |
| Hardness (° Shore A, 30 sec.): | | | | | | | | | |
| Before Brabender plasticizing | 75 | 77 | 75 | 74 | 75 | 66 | 70 | | |
| After Brabender plasticizing | 72 | 73 | 71 | 71 | 77 | 63 | 71 | | |
| Melt Index "E" (dg./min.): | | | | | | | | | |
| Before Brabender plasticizing | 1.6 | 0.16 | 0.98 | <0.1 | 1.2 | 5.9 | 0.13 | | |
| After Brabender plasticizing | 5.1 | 0.61 | 7.0 | 1.1 | 2.5 | 48.4 | 4.3 | | |

*Cross-linked, no dimensional stability. Resembles scorched rubber. Processability is impossible after heat treatment. Product is insoluble in dimethyl formamide and other highly polar solvents.
**Sample already broke.

NOTE.—Arubren CP is a trade name for chlorinated paraffin; Desmodur TT is a trade name for 2,4-tolylene di-isocyanate dimer; Umen C 4400 is a trade name for stearylamide; Linevol 79 P is a trade name for phthalic acid ester of Linevol alcohols, which are straight-chain aliphatic $C_7$-$C_9$ alcohols (plasticizing agent).

From the Table it is clear that stearic acid alone is not a good stabilizer; the values for the tensile strength, modulus 300 percent and elongation at break for the thermoplastic product are low.

Desmodur TT alone acts in quite a different way, as shown by the values in the Table, which clearly demonstrate that a cross-linked product is obtained.

The terms "rubber" and "elastomer" herein are interchangeable and refer to "a substance that can be stretched at room temperature to at least twice its original length and, after having been stretched and the force removed, returns with force to approximately its original length in a short time, " in accordance with ASTM Special Technical Bulletin No. 184.

What we claim is:
1. A stabilized thermoplastic polyurethane composition which comprises:
   a. a thermoplastic polyurethane elastomer;
   b. from about 0.2 to about 10 percent by weight on said elastomer of an organic di-isocyanate dimer of the structure:

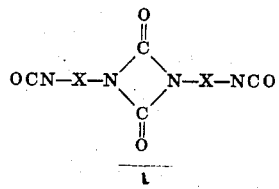

wherein X represents a hydrocarbon radical of up to about 16 carbon atoms, and
   c. from about 0.2 to about 10 percent by weight on said elastomer of at least one inhibitor for cross-linking said polyurethane elastomer.

2. A stabilized composition according to claim 1, wherein the thermoplastic polyurethane elastomer has the following general formula:

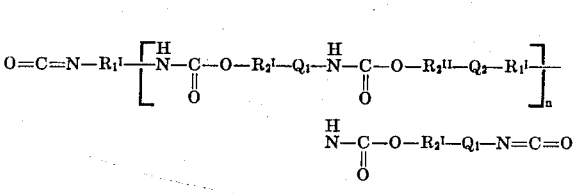

in which $Q_1$ represents a group of the general formula:

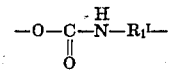

or a group of the formula:

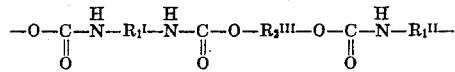

$Q_2$ represents a urethane group

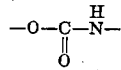

or a group of the formula:

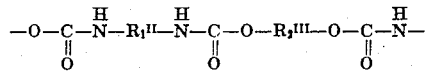

n represents an integer in the range of from 5 to 60 inclusive; $R_1{}^I$ and
$R_1{}^{II}$ represent radicals derived from low-molecular weight di-isocyanates, which may be the same or different;
$R_2{}^I$ and $R_2{}^{II}$ represent radicals derived from high-molecular weight diols, which may be the same or different, and
$R_2{}^{III}$ represents a radical derived from a low-molecular weight diols.

3. A stabilized composition according to claim 2, wherein the high-molecular weight diol, from which $R_2{}^I$ and $R_2{}^{II}$ are derived, is a poly-1,2-propane diol.

4. A stabilized composition according to claim 2, wherein the low-molecular weight diol, from which $R_2{}^{III}$ may be derived, is 1,4-butanediol or 1,6-hexanediol.

5. A stabilized composition according to claim 2, wherein $R_1{}^I$ and $R_1{}^{II}$ represent radicals derived from 1,5-di-isocyanatonaphthalene or methylene diphenyl di-isocyanate.

6. A stabilized composition according to claim 1, wherein the organic di-isocyanate dimer has the structure:

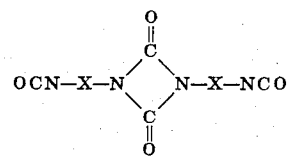

wherein X represents a group containing an aromatic radical.

7. A stabilized composition according to claim 6, wherein X represents a group selected from diphenylmethyl, tolyl, ditolylmethyl, diphenylethyl and naphthyl.

8. A stabilized composition according to claim 1, wherein a dimer of methylene diphenyl di-isocyanate or of 2,4-toluene di-isocyanate is used in an amount from about 0.5 to about 5 percent by weight on elastomer.

9. A stabilized composition according to claim 1, wherein the cross-linking inhibitor is at least one organic acid.

10. A stabilized composition according to claim 9, wherein the organic acid is selected from the group consisting of furoic acid, benzoic acid, stearic acid and alpha-naphthoic acid.

11. A stabilized composition according to claim 9, wherein said composition also contains from about 0.5 to about 5 percent by weight on elastomer of a halogenated paraffin wax.

* * * * *